Dec. 1, 1953   J. THORNTON   2,660,727
NAIL FEEDING AND DRIVING IMPLEMENT
Filed Dec. 31, 1949   3 Sheets-Sheet 1

Inventor
Jens Thornton
by Wright, Brown, Quinby & May
Attys.

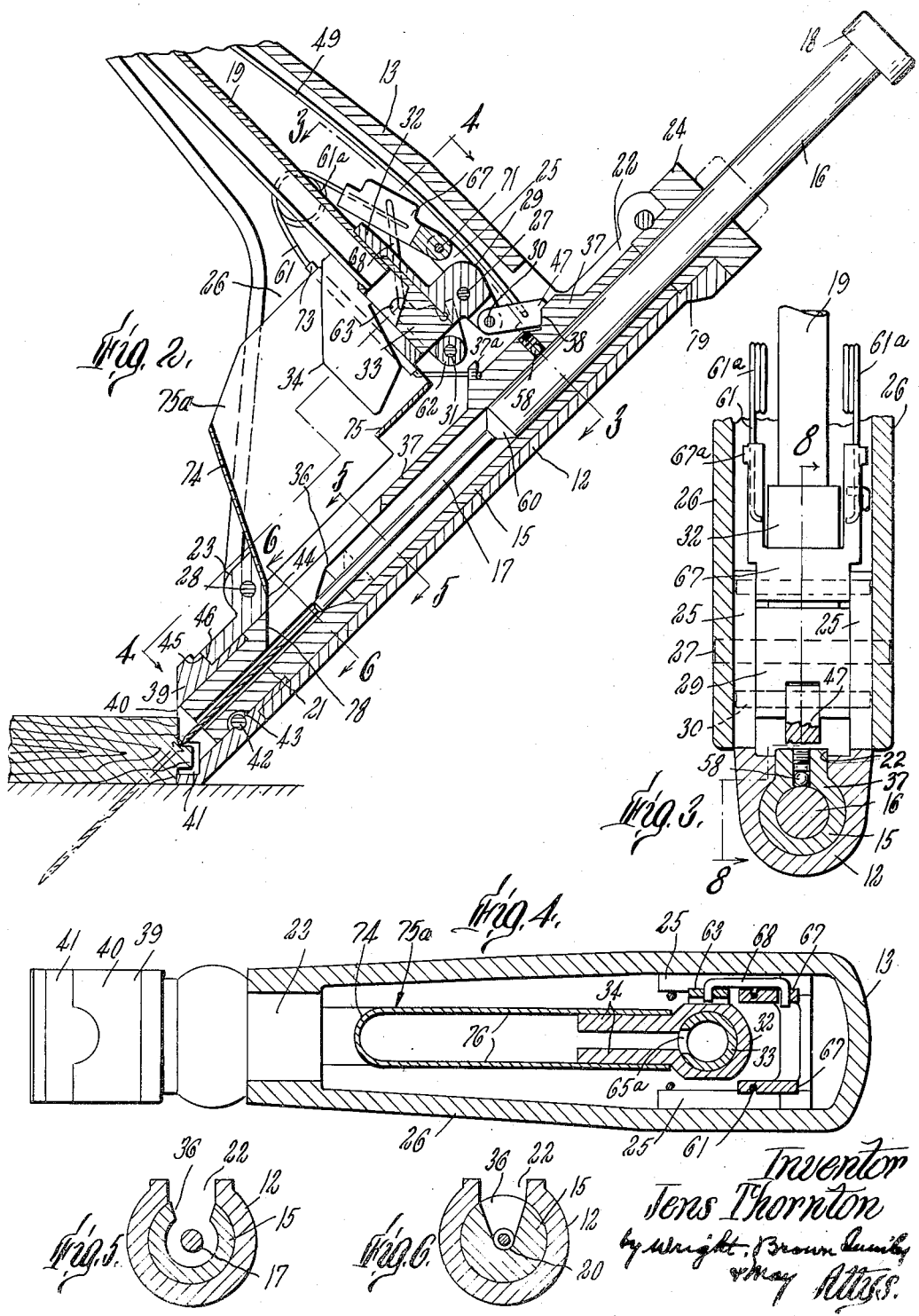

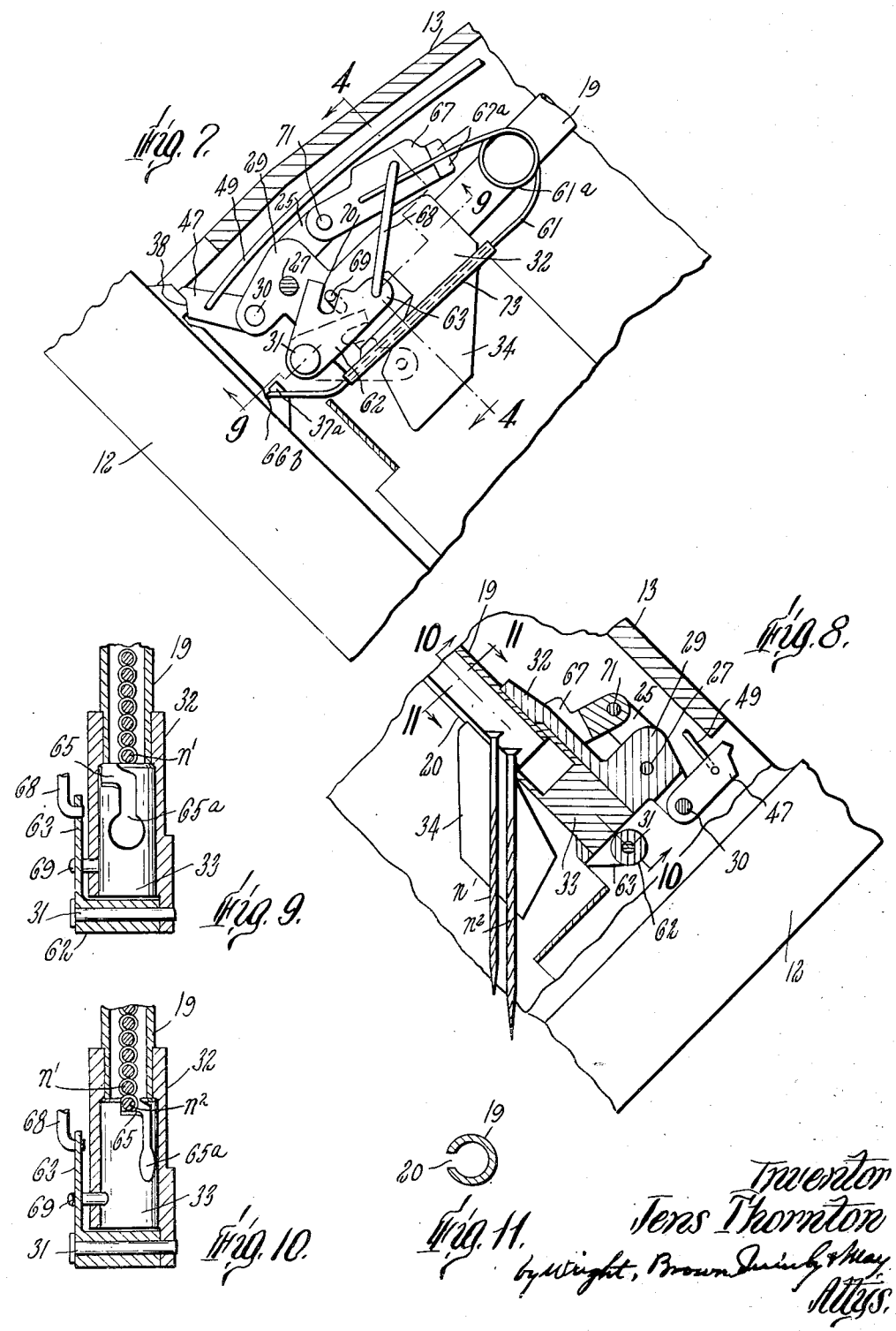

Patented Dec. 1, 1953

2,660,727

UNITED STATES PATENT OFFICE 2,660,727

NAIL FEEDING AND DRIVING IMPLEMENT

Jens Thornton, Quincy, Mass., assignor to The Independent Nail and Packing Company, Inc., Bridgewater, Mass., a corporation of Massachusetts Application December 31, 1949, Serial No. 136,193

12 Claims. (Cl. 1—46)

The present invention relates to nailing implements for machines which are equipped with means for holding a supply of nails, feeding means for delivering nails successively to a point of delivery, and a driver adapted to be actuated by hammer blows applied by the user to eject and drive the nails.

A comprehensive object of the invention has been to provide a tool or implement of this type, which is rugged, efficient and reliable, and practically immune from getting out of order. Related objects are to effect rapid and sure placement of the driver in what may be called its retracted position, i. e., a position in which it is ready to be advanced by hammer blows, when the implement is placed at a location where a nail is to be driven; to utilize the driver for setting nails so that their heads are flush with, or sunken within, the adjoining surfaces of the boards, etc. into which they are driven; to utilize the implement for transmitting force against the edge of a board in which a nail is being, or has just been, driven so as to force the opposite edge of the board against an adjoining board; to cause feeding of nails in correct timing with other functions of the implement; and accomplish other improved functions and results.

The invention consists in the implement or tool described in the following specification, by which the foregoing and other objects are accomplished, and in all equivalents and modifications thereof having the essential characteristics of structure and function set forth in the appended claims.

A nail driving implement embodying the invention, and designed particularly for nailing the boards of a finished floor on a sub-floor is shown in the accompanying drawings, in which—

Fig. 2 is a similar view showing the implement in a second operative position; representing the driver as having been partially advanced from its retracted position and showing also, by dotted lines, the fully advanced position of the driver and the driven and set position of a nail;

Fig. 3 is a section on the line 3—3 of Fig. 2;

Fig. 4 is a section on the line 4—4 of Figs. 2 and 7;

Fig. 5 is a section on the line 5—5 of Fig. 2;

Fig. 6 is a section on the line 6—6 of Fig. 2;

Fig. 7 is a view partly in section and partly in elevation of the central part of the implement as seen from the opposite side from the point of view of Figs. 1 and 2;

Fig. 8 is a fragmentary sectional view taken on line 8—8 of Fig. 3; but with the parts in the position of operation shown in Fig. 1;

Fig. 9 is a detail sectional view taken on line 9—9 of Fig. 7;

Fig. 10 is a section on the line 10—10 of Fig. 8;

Fig. 11 is a detail section taken on line 11—11 of Fig. 8.

Like reference characters designate the same parts wherever they occur in all the figures.

Figure 1:
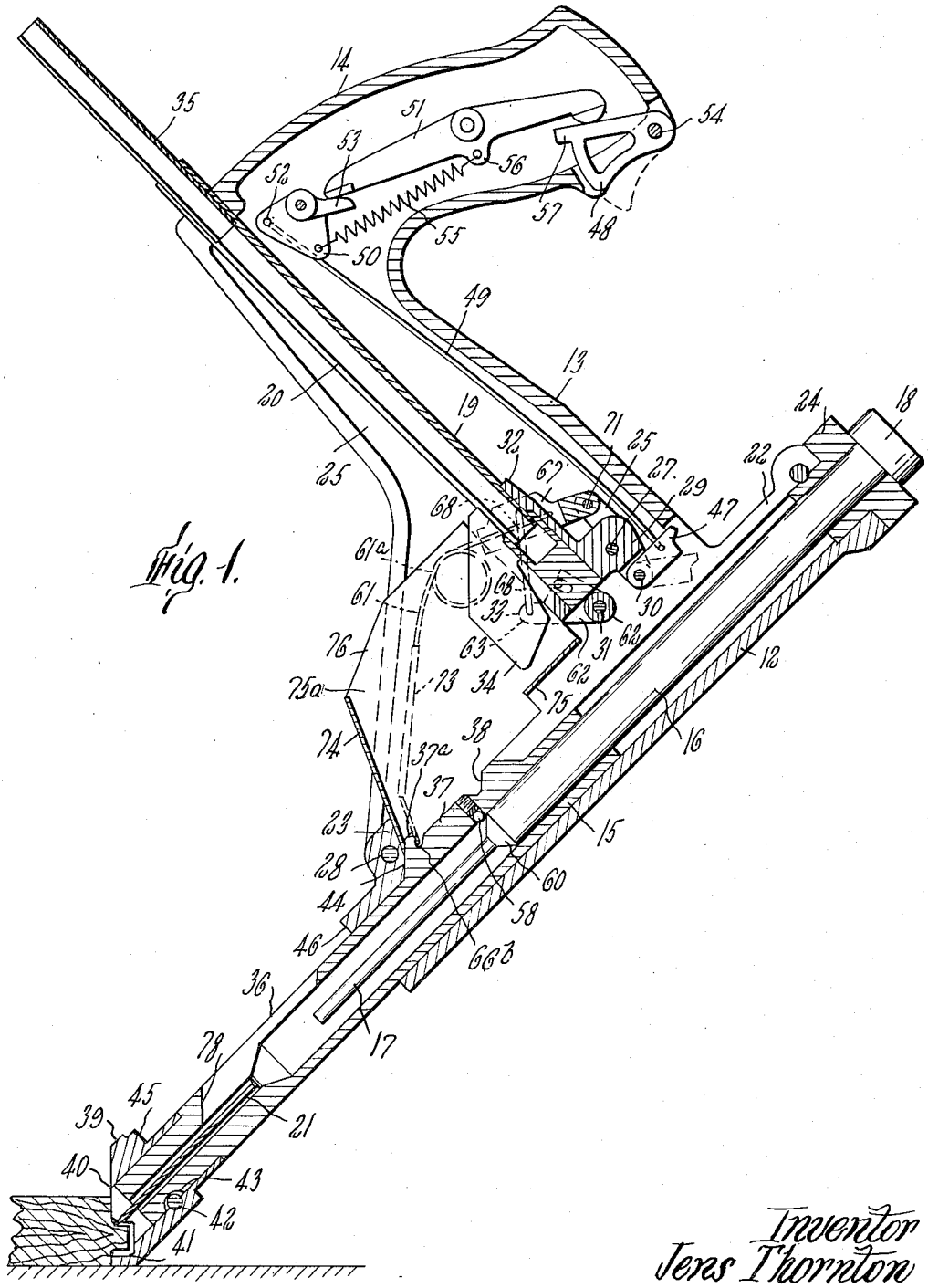
Fig. 1 is a sectional view of the implement in its first operative position for placing a nail to be driven.

The principal parts of the implement comprise a barrel 12 to which a lateral handle arm 13 having a hand grip 14 is attached, a sleeve 15 fitted to slide freely in the barrel 12, a driver rod 16 fitted to slide in the sleeve 15, having a driving pin extension 17 at one end and a head 18 at the other end, a raceway 19 adapted to contain the heads of nails arranged in a row with their shanks projecting through a slot 20 in the under side of the raceway, and a feeder or escape device actuated semi-automatically in a manner presently described to deliver nails into a nail guiding passage 21 in the lower end of the sleeve 15.

The barrel 12 is provided with a longitudinal slot 22 in one side extending from its outer or upper end to a lug 23 near its lower end. A tubular cap 24 is set into the outer end of the barrel and serves as a guide for the driver rod 16. Parallel webs 25, 25 (Fig. 3) project laterally from the barrel 12 at opposite sides of the slot 22, providing means for attachment of the arm 13.

The handle arm and hand grip are made preferably as a metal stamping, or may be a hollow casting, with a top wall portion to which the numeral 13 is applied in Figs. 1 and 2, and depending webs 26, 26 which embrace the webs 25, 25 (Fig. 3) and the lug 23 previously mentioned, and are made fast detachably by pins 27, 28.

A block 29 is located between the webs 25 and fastened rigidly to them by pins 27 and 31. It has a tubular portion 32 in which the inner end of the raceway 19 is secured and in which a cylindrical nail feeder or escape device 33 is rotatably mounted in line with the raceway. A slot is formed in the under side of the tubular portion 32 in alinement with the slot 20 in the underside of the raceway, and two wings 34, 34 extend downwardly from the tubular portion 32 at opposite sides of the slot therein, forming part of guiding means for nails released from the raceway.

It may be noted that the outer end of the raceway 19 projects through an opening in the outer wall of the hand grip 14 and is adapted to receive detachably a nail magazine or extension raceway 35.

Sleeve 15 serves as a guide for the driver rod 16 and as a placer and guide for the nail to be driven. For these purposes, it is formed with a large bore through the greater part of its length from the upper end, to receive with a free sliding fit the driver rod 16, and with a narrow bore 21 in its opposite end slightly larger than the heads of nails which it is designed to apply, and in which the extension pin 17 fits slidingly; it is formed with a slot 36 in the same plane with the slot in the raceway 19 and the passageway between the webs 34, to receive nails falling from the feeder and guide them into the restricted bore 21; and it is slidable endwise in the bore of the barrel 12, having a rib 37 which projects into the slot 22 (Figure 3) of the barrel and maintains the sleeve with its slot 36 in the position relative to the raceway slot above mentioned. A notch having an inclined abutment face 38 is formed in this rib.

In the illustrated embodiment of the invention, which is designed for the blind nailing of matched floor boards, the arrangement of the parts is such that the barrel is held at an angle of approximately 45° with the horizontal when in position for driving nails and the handle arm and raceway extend at an angle of approximately 90° upwardly from the upper side of the barrel. A shoe 39 is fitted to the lower end of sleeve 15 having a beveled surface 40 which is adapted to be laid against the edge of a board in position to be nailed, and a groove 41 to receive the projecting tongue of such a board. It is freely rotatable on the end of the sleeve and is retained thereon with provision for limited rotation by a rivet 42 which traverses a tangential groove 43 of larger radius in the side of the sleeve.

Assuming that in the operation of the device after a nail has been driven, the shoe 39 will be slid along the tongue of the floor board to the point where the next nail will be driven, the body structure which comprises the barrel 12 and handle arm assembly slides up and down on the sleeve 15 as the sleeve remains in contact with the edge of the floor board. Such upward movement of the body structure is limited by engagement of the stop surface 44 (Figure 2) on the lower end of the rib 37. The downward movement of the body structure is limited by engagement of the lower end 46 of the barrel against a shoulder 45 on the sleeve, as shown in Figure 2.

Latch 47 is coupled with a trigger 48 (Fig. 1) in the handle 14 by a link 49, a bell crank lever 50, and a lever 51. Link 49 extends from the latch to connection with one arm of lever 50 at point 52, and a second arm 53 engages one arm of lever 51, the other arm of which bears on the trigger 48 which is pivoted to the handle at 54. A spring 55 is connected with a third arm of bell crank 50 and with a short third arm 56 of lever 52, in an arrangement such that it causes lever arm 53 to exert force against lever 51, and the latter to exert force against trigger 48. The spring therefore normally holds the latch 47 in the projected position shown in Fig. 2, and the trigger 48 in the dotted line position shown in Fig. 1, where it is retained by a stop lug 57 bearing on the inner surface of the adjacent wall of handle 14.

When the body structure is moved to its upper position, as in Fig. 1, carrying with it the driver rod 16, a ball detent 58 is projected into the bore of the sleeve 15 just below the shoulder 60 of the rod. This ball is pressed inward by a resilient cushion or spring confined between the ball and a screw set in a transverse passage in the rib 37, the inner end of the passage having a rim of smaller diameter to prevent escape of the ball into the bore. When the body structure is subsequently moved to the lower position shown in Figure 2, the ball 58 serves to retain the driving rod releasably in its upper or retracted position.

The nail feeder or escape device 33 is operated to deliver nails into the contracted bore 21 of sleeve 15 by, and under control of, the body structure in its reciprocating movements through the agency of a spring 61 which is coupled with the sleeve and with the body structure.

The nail feeder 33 bears at its lower end on the hub 62 of a lever 63 which is mounted to turn about the pivot 31 and is located in a narrow space between one of the wings 25 and a portion of the block 29. The feeder is freely rotatable in the bore of the block extension 32.

It has a deep central recess extending inward from the upper end, the rim of which surrounds the inner end of raceway 19. In one of its side walls is an angular slot 65 which opens through the rim of the feeder, and is offset laterally in an intermediate portion. The entrance and offset parts of the slot are wide enough to admit the shanks, but not the heads, of the nails which are used with this implement, and the offsetting is sufficient to form a shoulder for arresting the nails, while the lower terminal portion 65a of the slot is wide enough to permit the heads to pass through.

The feeder is rotated alternately in opposite directions through an angle equal to the angle between the laterally offset portions of the slot, between a position in which the entrance to the slot registers with the slot 20 in the raceway, and another position in which the terminal portion 65a registers with the passageway between the wings 34, shown in Fig. 4; such passageway being wider than the shanks, but narrower than the heads of the nails. This passageway serves to keep the shanks of the lowermost nails in a common vertical plane so that when the lowermost nail is released by the feeder 33, it is properly oriented to fall through the slot 36 and into the guiding passage 21.

The feeder is rotated in this manner by lever 63 (Figures 7, 9 and 10) which, in turn, is rotated back and forth by a lever 67 to which it is coupled by a link 68 and to which the spring 61 also is coupled. A pin 69 projects from the feeder through a slot in the side of the bearing extension 32 into a notch 70 in lever 63 whereby oscillations of that lever are transmitted to the feeder. Spring 61 is a bowed spring engaged at one end in a pivotal manner with a hook 37a on sleeve 15 and at its other end in a rigid manner with the lever 67, which lever is pivoted at 71 to the webs 25. The spring is put into a sharply bowed position when the body structure slides down the sleeve 15, and when in that position the spring holds the levers 67 and 63 in the positions best shown in Fig. 7, and causes the nail feeder to occupy the position shown in Fig. 9 where the entrance to slot 65 is displaced from the raceway slot and the delivery end 65a of the feeder slot registers with the passage between the wings 34.

In order to afford sufficient scope for the spring 61, so that it will be under stress throughout the full movement of the body structure on the sleeve 15, while keeping its over all dimensions within suitable limits, its intermediate portion is made with several turns of a helical coil 61a. The end which is engaged with lever 67 is confined in a groove in the outer side of the lever into which it is locked by lugs 67a, and its extremity is passed through a hole in the lever. This provides a rigid connection between the spring and the lever and makes pivot 71 the abutment for the reaction of the spring. As the tendency of the spring is to straighten, it exerts force constantly tending to slide the body structure upward on the sleeve, and when such movement takes place, it swings lever 67 about pivot 71, to the position shown in Fig. 1, thereby rotating lever 63 and turning the nail feeder to the position in which it can receive a nail from the raceway 19, as shown in Fig. 10. When the body structure moves down again, the spring and nail feeder are returned to the positions previously described.

Preferably, and as here shown, the spring 61 is double (Figure 3), being in effect two springs which are connected by a cross member 66b, which extends across hook 37a. The two springs lie at opposite sides of the raceway 19 and lever 67 is forked, having two branches which straddle the raceway and to each of which one of the springs is secured in the manner described. Conveniently, both springs may be made of a single piece of spring wire. The long arm of each spring, which extends from the coil to the hook 37a, is stiffened and held straight through a large part of its length by a metal tube 73 which surrounds it closely.

A narrow funnel 75a having a front wall 74, a back wall 75 and parallel side walls 76, is provided to guide the nails in their free-falling passage from the feeder to the slot 36 in the side of the sliding sleeve 15. The side walls 76 of the funnel embrace the wings 34 and are rigidly secured thereto. There is an opening between the front wall 74 and rear wall 75 which registers with slot 36 when the body structure is in its lower position; the end wall 78 of the slot being then in register with the surface 44 and the wall 74 of the funnel terminating at the surface 44.

In using the implement herein described, its raceway being loaded with nails, the user grasps it by the handle 14 and presses the trigger 48 inward, whereby the sleeve 15 is released and allowed to slide out of the barrel 12 by the combined action of gravity and the force of spring 61. During the outward movement of the sleeve, the feeder 33 is turned to the angular position shown in Fig. 10 so that the entrance to its slot 65 is put in register with raceway slot 20, and the lowermost nail in the raceway, which had previously rested against the rim of the feeder 33 in the position $n'$ shown in Fig. 9, is allowed to enter the feeder slot and rest against the offset shoulder therein in the position $n^2$ shown in Figs. 8 and 10.

The user then places the shoe 39 against the edge of the finish floor board next to be nailed to the under floor and pushes the body structure down until the end of the barrel brings up against the shoulder 45 of the shoe. During this downward movement by the body structure, the driving rod 16 is maintained by the ball detent 58 in its upper or cocked position, that is, fully retracted with respect to the sleeve 15. At the same time the deformation of the spring 61 resulting from such movement acts through the levers 67 and 68 and the pin 69 to turn the nail feeder 33 to the position shown in Fig. 9 so as to release the nail which previously occupied the position $n^2$ so that the nail falls by gravity through the funnel and the slot 36 into the bore 21.

The final action is to drive the nail by hitting the end of the driver rod with a hammer. Fig. 2 shows the driver rod in the course of being moved downward and having advanced far enough from the fully retracted position to come in contact with the head of the nail in the guideway 21. A few hammer blows suffice to drive the nail all the way in. Skilled operators can frequently fully drive a 2½ inch nail by a single blow.

The driver rod thus actuated not only drives the nail in to the full length of its shank, but also sets the nail; that is, advances the nail head to a position flush with the surface of the board or even below the surface. The drawing shows how this is accomplished in the case of a nail driven into the angle between the edge and the tongue of a floor board so that the nail head coincides with the apex of the angle, leaving no obstruction to the placement of another board. This effect cannot be accomplished by a hand wielded hammer in direct contact with the nail, without badly marring the board, but requires an additional operation with the aid of a nail set. The cap 24 limits the advance of the driver and thereby the depth to which the nail can be set, in accordance with the length of the driver rod and its extension pin 17. By making the extension pin with a prescribed length, the depth to which the nail head can be set is exactly determined and regulated.

It will be noted that when the driver rod is fully advanced in the course of driving a nail, its head 18 bears against the cap 24, which bears against the outer end of the barrel 12, and the inner end of the barrel bears against the shoe 39. Thereby a rigid force transmitting structure is provided between the head of the driver and the shoe, whereby the final impact of force in driving a nail is applied also through the shoe to the edge of the board, forcing the latter tightly against the next board back of it. This is a feature of substantial advantage in the laying of finished flooring. Owing to the extended area of the surface of the shoe which comes against the edge of the board above the tongue, the board is not harmed by such force application.

While I have here illustrated the invention as embodied in a floor nailing implement adapted to be used in a manner such as to drive nails at an inclination, I wish to make it clear that it is not limited to that specific use or arrangement of parts. It is applicable to other nailing uses as well, upright as well as inclined. The specific shoe here shown can be replaced by other shoes or foot pieces conformable to different specific purposes, and a nail raceway and the feeder can be mounted at other angles than right angles to the path of the driver, or equipped with mechanical means for propelling the nails along the raceway.

In the generic aspects of the invention, the barrel 12 and handle arm constitute the body structure by which all other parts are supported and to which all movable parts, except the sleeve 15 and driver rod, are connected. The barrel serves as a guide for the sleeve 15 or its equivalent and may have other forms than cylindrical. The sleeve may also have other forms than cylindrical. Various changes and modifications in form, dimensions and proportions of the several parts of the implement may be made without departing from the spirit and scope of the invention.

What I claim is:

1. A nail driving implement comprising a body structure having a straight guideway, a sleeve fitted for free endwise movement in said guideway whereby said structure is adapted to be advanced and retracted on said sleeve, a driver rod fitted for free endwise movement in said sleeve and engageable by said structure to be retracted therewith, the sleeve having a nail guiding passage in its lower end, and the driver rod having an extension pin movable through said guiding passage for expelling nails therefrom, the sleeve having a detent element arranged to engage under a shoulder on the driver rod when the body structure is retracted and to yieldingly maintain the driver rod in its retracted position when the body structure is subsequently advanced on the sleeve.

2. A nail driving implement as set forth in claim 1 combined with a nail holding raceway, a feeder or escape device at the inner end of said raceway shiftable to release nails therefrom, the sleeve having an opening in its side leading to the nail guiding passage and the body structure having guiding means arranged to conduct nails from the escape device to said opening, and means controlled by the body structure in its advancing and withdrawing movements for actuating said escape device to release nails into the sleeve when the body structure is advanced on the sleeve.

3. A nail driving implement comprising a body structure having a handle and a guideway, a sleeve slidably fitted in said guideway for advancing and retracting movements of said body structure thereon, a latch mounted in the body structure disposed to interlock with the sleeve when the body structure is in its advanced position, trigger means associated with the handle portion and latch operable to release the latch and permit retracting movement of the body structure, the sleeve having a nail guiding passage in its outer end portion arranged to hold nails in position for being driven, a driver rod fitted to move endwise in said sleeve and having an extension arranged to pass through the nail guiding passage from a retracted position to drive out nails contained in said passage, and means carried by the sleeve for engaging and yieldingly detaining the driver rod in a retracted position when said rod has been moved to such position by retraction of the body structure on the sleeve.

4. In a nail driving implement having a body structure and an endwise movable driver rod adapted to be impelled by hammer blows so as to drive nails, means for yieldingly detaining the driver rod in a retracted position, comprising a sleeve member on which said body structure is movable and in which the driver rod is movable endwise, said sleeve having a nail guiding passage to receive nails in position to be driven and having a detent element engageable with the driver rod and operable to yieldingly detain the driver rod in its retracted position when the body structure is advanced from its retracted position.

5. A nail driving implement comprising a body structure, a driver rod disposed to move endwise in said body structure between a position in which its head end projects therefrom and a nail driving position, an elongated member on which said body structure is slidable between an advanced position and another position in which it is retracted together with the driving rod, and a detent element carried by said elongated member and engaging said rod to detain the rod yieldingly in its retracted position when the body structure is advanced.

6. A nail driving implement according to claim 5, in which the elongated member has a nail guiding passage in its forward end which is clear of the driver rod when the latter is in its retracted position and through which the foot end portion of said rod is movable, combined with a nail magazine, a nail feeder or escape device at the inner end of the nail magazine, and means controlled by the body structure for actuating the nail feeder to deliver nails into said passage when the body structure is in its advanced position and the driver rod is in its retracted position.

7. In a nail driving implement, a sleeve, a shoe connected with the lower extremity of the sleeve, a barrel member slidable on said sleeve from a retracted position to an advanced position in which its lower end abuts said shoe, a driving rod longitudinally movable within said sleeve, a cap on the upper end of said barrel member through which cap said rod extends, and a head on said driving rod arranged to abut the outer face of said cap when the rod is fully advanced in the course of driving a nail, said head, barrel member and shoe forming a rigid structure adapted to transmit the force of hammer blows to anything against which the shoe abuts.

8. In a nail driving implement, the combination of a supporting structure having a guideway, a nail raceway mounted in the supporting structure extending toward said guideway, an elongated member movable endwise in said guideway, a nail feeder mounted in extension of the inner end of the raceway, rotatable back and forth for picking off and releasing nails from the raceway, a lever pivoted on the supporting structure having a pin and slot connection with the nail feeder, a second lever pivoted on the supporting structure in linked connection with the first named lever, a bowed spring in rigid extended connection with the second named lever and engaged with said elongated member, the spring and levers being arranged to turn the nail feeder back and forth in response to relative movements between said supporting structure and said elongated member.

9. A nail driving implement comprising a sleeve, a body structure slidable on said sleeve, a driver rod slidable in said sleeve, a head on said driver rod engageable by said body structure to retract the rod when the body structure is retracted on the sleeve, and means carried by said sleeve yieldingly detaining said rod in its retracted position when the body structure is advanced.

10. In a nail driving implement, a sleeve, a body structure slidable on said sleeve, said body structure having a guideway to guide nails into said sleeve, a nail raceway mounted in said body structure extending toward said guideway, means for feeding nails one by one from the raceway to the guideway, and means including a member rotatable back and forth to pick off single nails from the raceway and to release single nails into the guideway, and means operable by sliding movements of the supporting body on the sleeve to operate said feeding means.

11. A nail driving implement as in claim 10, and spring means pressing said body structure toward its retracted position on said sleeve.

12. A nail driving implement as in claim 10, a nail magazine carried by said body structure, and feeding means operable by reciprocation of said body structure on said sleeve to feed nails one by one from said magazine into said sleeve.

JENS THORNTON.

References Cited in the file of this patent

UNITED STATES PATENTS

| Number | Name | Date |
|---|---|---|
| 403,843 | Junkins | May 21, 1889 |
| 462,848 | McCornack | Nov. 10, 1891 |
| 508,547 | King | Nov. 14, 1893 |
| 1,237,360 | Martin | Aug. 21, 1917 |
| 1,368,274 | Mackey | Feb. 15, 1921 |
| 1,390,060 | River | Sept. 6, 1921 |
| 1,845,617 | Metcalf | Feb. 16, 1932 |